United States Patent Office 3,311,995
Patented Apr. 4, 1967

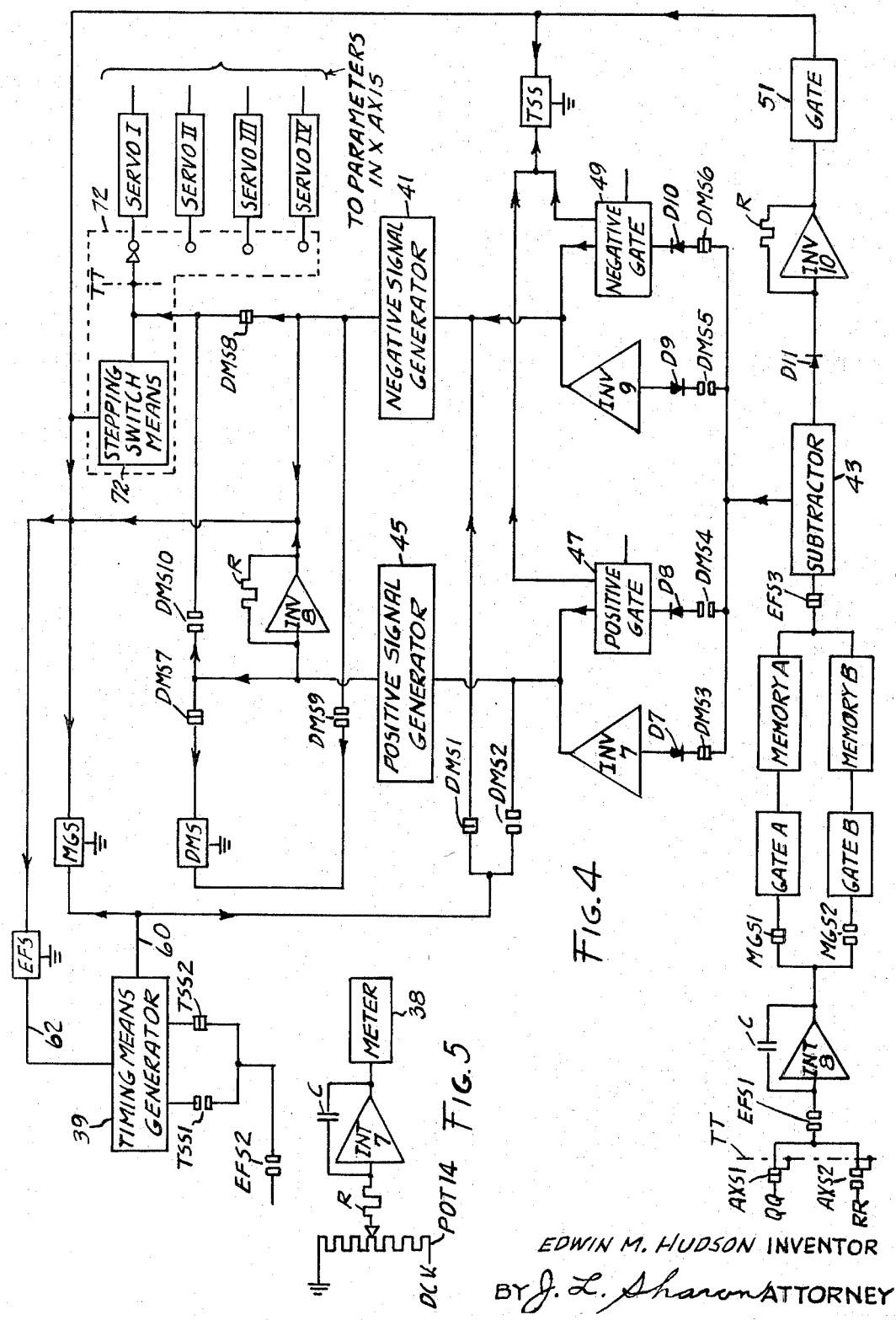

3,311,995
ADAPTIVE TRAINING DEVICE
Edwin M. Hudson, Brooklyn, N.Y., assignor to Otis
Elevator Company, New York, N.Y., a corporation of
New Jersey
Filed Mar. 18, 1963, Ser. No. 265,729
18 Claims. (Cl. 35—12)

This invention relates to simulation apparatus and more particularly to adaptive simulation apparatus.

In training an individual to operate a mechanism two general approaches are possible; the "whole" method or the "part" method. In the "whole" method the individual is confronted with the entire task at once and trains on a trial and error basis until he has mastered it. In the "part" method the individual learns one part of a task at a time until all parts are separately learned. He then attempts to assimilate all parts until he is skilled in the entire task.

Both methods have inherent disadvantages. The "whole" method suffers because its efficiency decreases as the complexity of the task increases beyond the point where all parts can be grasped at once. The "part" method because it is difficult to take this approach with some mechanisms. For example, in flying an aircraft a trainee cannot control only one variable such as heading, or altitude to the exclusion of all else. He must attempt to keep all variables within certain tolerances at all times. The closest approximation to the "part" method in these type vehicles is to start with the simplest vehicle of the type and progress to more and more complex ones until that which it was originally desired to learn to opertae has been mastered.

Moreover, this "part" method of instruction leads to difficulty in that in progressing from a simple vehicle to one of more complex design, the size of the steps in the progression is limited to the different vehicles that are available. To overcome this disadvantage simulators have been devised, the control characteristics of which can be manually changed to provide the size and number of steps desired. But even with these simulators there is no capability for determining the proper step size at each stage of learning for each individual trainee.

In designing complex mechanisms where one component interacts with others it is difficult to select that combination of values for mutually reactive components that will give the most desirable end result. This investigation is aided materially by the use of a simulated vehicle in which the many factors may be revised repeatedly to secure the best operating combination. It is also aided greatly if the simulated apparatus can be made self-connective or self adjusting such that, in effect, an operator by using the apparatus automatically selects the optimum values for the interacting components.

It is therefore an object of the invention to provide apparatus useful as a training aid.

It is a further object of this invention to provide apparatus useful in general as a design tool.

It is another object of this invention to provide apparatus that will facilitate both the design of a variety of mechanisms and the training of individuals to operate such mechanisms.

It is a still further object of this invention to provide apparatus which automatically adapts its control characteristics in accordance with the performance of an operator.

It is still another object of this invention to provide apparatus which adapts its control characteristics to values which permit performance in a specified manner in response to control actuation, or, alternatively, which by maintaining its control characteristics as constants permits a determination of the maximum task that a simulated vehicle or an operator can perform.

Further objects and advantages of the invention will be apparent from the following description considered together with the accompanying drawing and from the appended claims.

In carrying out the invention in the simulator to be described, six parameters were taken into consideration to assure a fair degree of fidelity to the characteristics of the mechanism being simulated. More or fewer could have been used. Five of these parameters are performance characteristics of the mechanism and the sixth is the task to be performed. In order the six are:

(1) The order of control. A system may vary from a relatively simple first order or rate control system, as in an automobile, to a difficult fourth order system, as in a submarine. The invention as later described will be limited to a maximum third order system but in such description it will be readily evident that the invention is not limited to such order system.

(2) The system stability of the mechanism simulated.

(3) The gain of the system; this being the relation between the magnitudes of the input control signal and output response.

(4) Amount of axes cross-coupling. This parameter refers to the degree to which movement along one axis produces movement along another axis.

(5) The lag of the system as represented by the time delay between input signal and output response.

(6) The extent of the task the operator is required to perform, i.e. the amplitude and frequency of maneuvers required to be made.

The manner in which finite values are assigned to these characteristics and the functions they serve will become apparent from the description that follows.

The simulation apparatus which is to be described may be used in training an individual to control the operation of a vehicle; or may be used in the design of a vehicle of an advanced type. In such utilization it is desirable that a trainee have some means for determining the effects of his input control actuations. In the described apparatus this is accomplished through the use of a cathode ray tube oscilloscope by which visual representations of the positions of a target and the simulated vehicle are presented in a display having two co-ordinate axes.

Although this arrangement limits the displayed target and simulated vehicle to movements in two dimensions, it imposes no limitation on the vehicular order of control that can be simulated. Order of control is a function of the number of sequential stages of energy storage that an input signal passes through before it results in an output response. Consequently, in simulating a vehicle a given order of control may be simulated by subjecting input control signals generated by control actuations of the operator to a number of integrations equal to the given order of control. By this method simulation of vehicles of any order of control may readily be accomplished through the employment of analog computer techniques.

Before proceeding, it should be understood that response of a vehicle can be represented visually along more than two axes by employing a display device that is capable of presenting a display in more than two dimensions. Such a device could take the form of two or more cathode ray tube oscilloscopes.

In training an operator to control a vehicle it has been found that it is also desirable to employ a realistic device for the actuating control element. Thus, according to the vehicle being simulated this element may be a control stick, a rudder control, or a steering wheel or it may take any other desired form. Whatever form this element takes its movement by an operator causes electrical signals to be supplied to one or more signal channels, each channel corresponding to one of the axes of presentation. Within each channel are electrical circuit elements so arranged as to modify the operator input signals in a desired fashion. These modified signals represent the responses of the vehicle being simulated to the operator's control actuations, if the parameters of the circuit elements have been properly chosen. In order to present such responses to the operator these modified signals are fed to the visual display device upon which the simulated vehicle and a target are simultaneously displayed.

The target may be displayed either as a moving or stationary one. If moving, the operator's task is to "pursue" it; that is, to cause the vehicle's movement to correspond. If stationary, the operator's task is to neutralize or counteract forces that tend to cause the vehicle's position to stray from that of the target. In either type of display the operator's task is to maintain the position of his simulated vehicle in registration with that of the target.

Any failure to perform this task is regarded as error. The presence or absence of error is used to vary the control characteristics of the simulator and in this manner the extent of the task required of the operator until he is proficient in controlling the simulated vehicle for which it was desired he be trained.

The manner in which the simulator that is to be herein described accomplishes the foregoing results will be better understood from the description which follows when taken in conjunction with the drawing in which:

FIGURE 4 is a block diagram of the invention utilized as a design tool; and

FIGURE 5 is a block diagram of indicator circuitry used with the invention.

Figure 1:
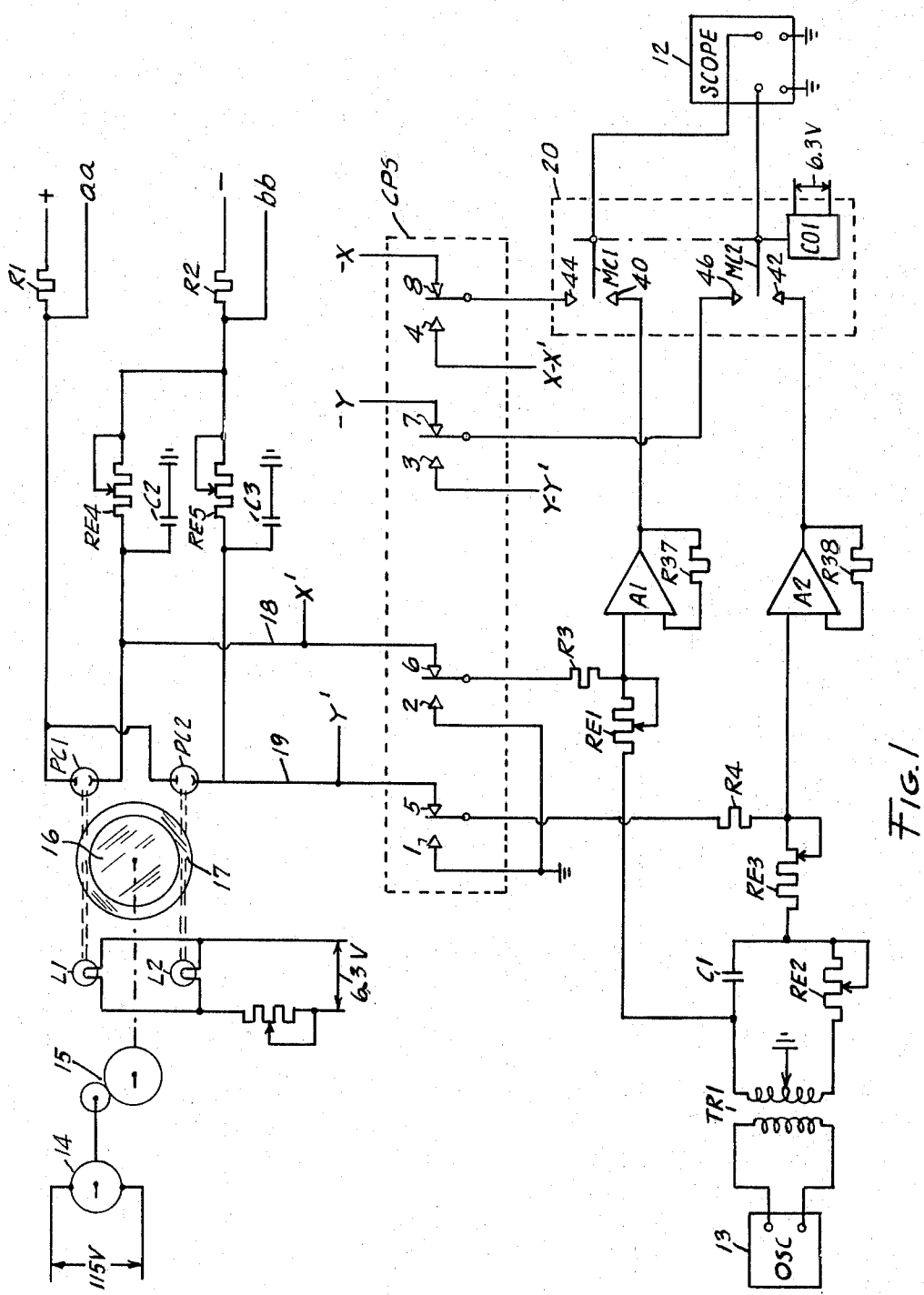
FIGURE 1 is a schematic block diagram of circuits for effecting the display of movement of a simulated mechanism and a target on the screen of a cathode ray tube oscilloscope.

Reference to the drawing will be made with the system arranged in a pursuit display type pattern for training an operator to control a vehicle such as a helicopter.

In the description which follows reference will be made to the drawing wherein certain of the circuit components are shown in block-diagrammatic form. This is especially true of the amplifying elements which in each case have been designated to indicate the operating mode. Each such amplifier is of the class commonly known in the analog computer technology as an "operational amplifier," and any suitable commercially obtainable unit may be used.

In this description finite values will be given for certain of the circuit components. This is done in the interest of completeness of explanation of one tested embodiment; it being understood, of course, that different values may well be used to accomplish desired design changes.

With reference now to the drawing and FIGURE 1 in particular it will be seen that oscillator 13 supplies sine wave oscillations to transformer TR1 the secondary of which is grounded at its midpoint and which is terminated in the 90° phase shifter comprising condenser C1 and resistor RE2—which may suitably have values of 1 mf. and 10,000 ohms, respectively. The 90° phase shifted outputs are fed through proportioning resistors RE1 and RE3 of about 1 megohm each to "operational" amplifiers A1 and A2, which are commercial type high gain direct current amplifiers, before being connected through contacts 40, 42 of commutating switch 20 to the vertical and horizontal deflection circuits of scope 12 to produce a circular image which is to serve as the target to be pursued by the operator trainee.

Motion is imparted to this target by the apparatus which might conveniently be called a function generator shown in the top half of FIGURE 1. Synchronous motor 14 drives circular variable density disc 16 through gear reduction 15. Disc 16 may be constructed in any suitable way such that its light transmitting properties vary with angular displacement. If desired this may be accomplished by adhering a varying density sheet of film 17 to one of the disc surfaces. To the left of disc 16 a pair of incandescent lamps L1, L2 form sources of light energy which is directed through the upper and lower portions of the disc to energize photocells PC1 and PC2 which are supplied direct potential through isolating resistors R1, R2 of 60,000 ohms each. Adjustable resistors RE4, RE5, which may suitably be of about 524,000 ohms each, provide means for balancing the two branches, in each of which sudden changes in voltage output are smoothed by capacitors C2 and C3 of 1 mf. each. As will be explained later lines $aa$ and $bb$ connect to adjustable apparatus in which it is possible to decrease the resistance to near zero value. Isolating resistors R1, R2 are provided to prevent the shorting of the direct potential source.

Photocells PC1 and PC2 in conjunction with resistors RE4 and RE5, respectively, form voltage dividers, the relative values of which depend upon the quantity of light being transmitted at any instant from light sources L1, L2 through disc 16 to the photoelectric cells. The varying outputs from these voltage dividers are connected over lines 18 and 19 to the inputs of amplifiers A1 and A2 through resistors R3, R4 of 1 megohm each. As these D.C. outputs vary, the position of the target on the screen of scope 12 is varied.

Contacts 44, 46 of commutating switch 20 are connected through contacts 7 and 8 of Compensatory-Pursuit switch CPS to leads X and Y on which are present potentials representative of the vehicles location. Commutating switch 20 is of the interrupter type actuated by its coil CO1 which is energized from a 60 cycle, 6.3 volt source of alternating voltage. Its movable contacts MC1, MC2 alternately switch the deflection circuits of scope 12 from contacts 40, 42 to contacts 44, 46 in such manner that both the target and vehicle positions are displayed simultaneously on the screen of scope 12.

The response or displacement of a third order vehicle, such as a helicopter, in response to control stick displacement is approximately stated by the following formula:

$$D_h = f(P) \ D_s dtdtdt$$

Where
$D_h$ = helicopter displacement
$f(P)$ = a variable which is a function of the helicopter parameters
$D_s$ = control stick displacement
$dtdtdt$ = the third integral with respect to time Thus, in order to simulate the response of a helicopter, an input signal, such as that generated by movement of the control stick, must be integrated three times and be multiplied by some variable which is representative of various parameters of a helicopter.

Figure 2:
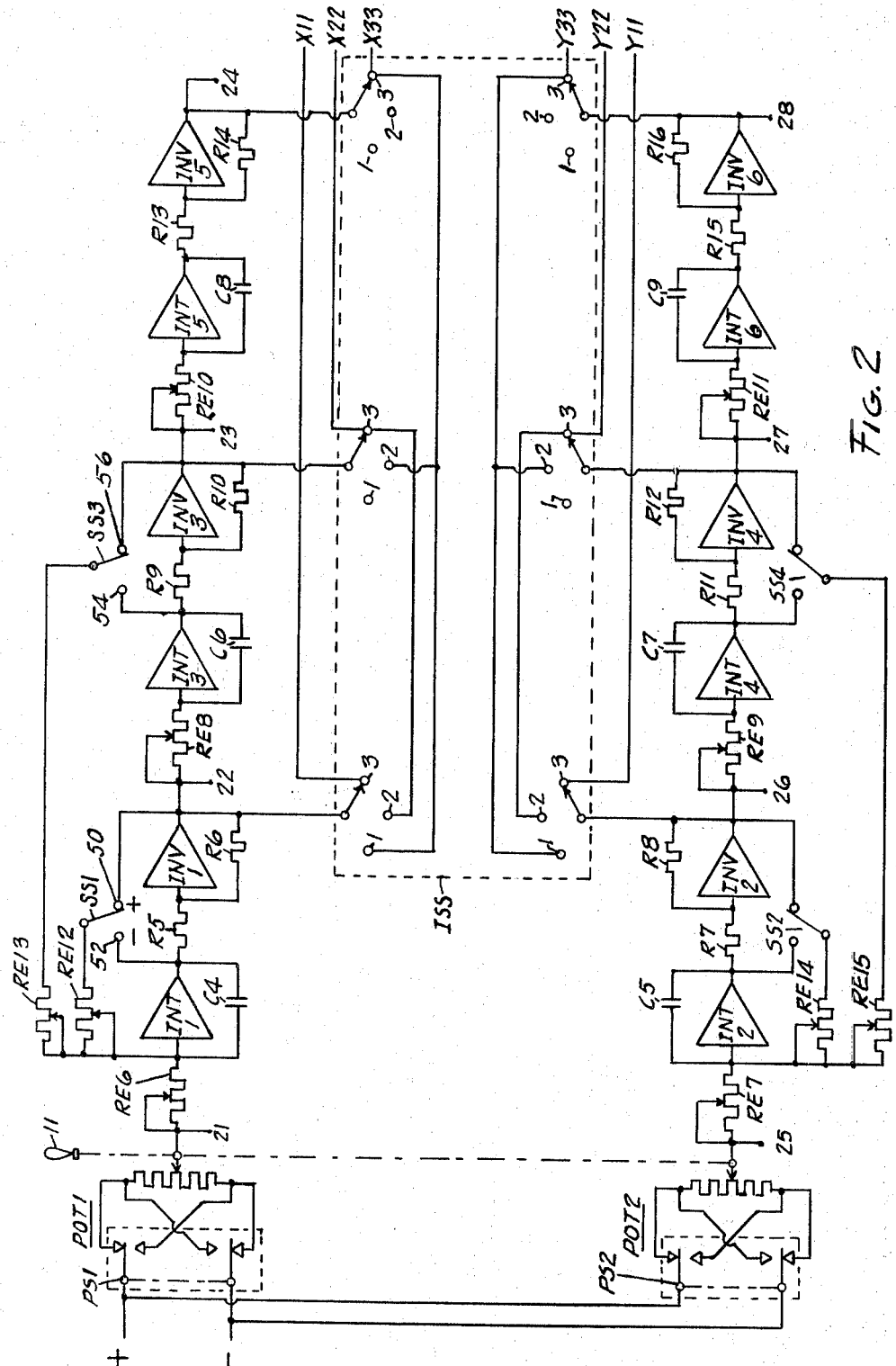
FIGURE 2 is a schematic block diagram of circuits for transforming input control signals into the co-ordinates of output response signals.
Figure 3:
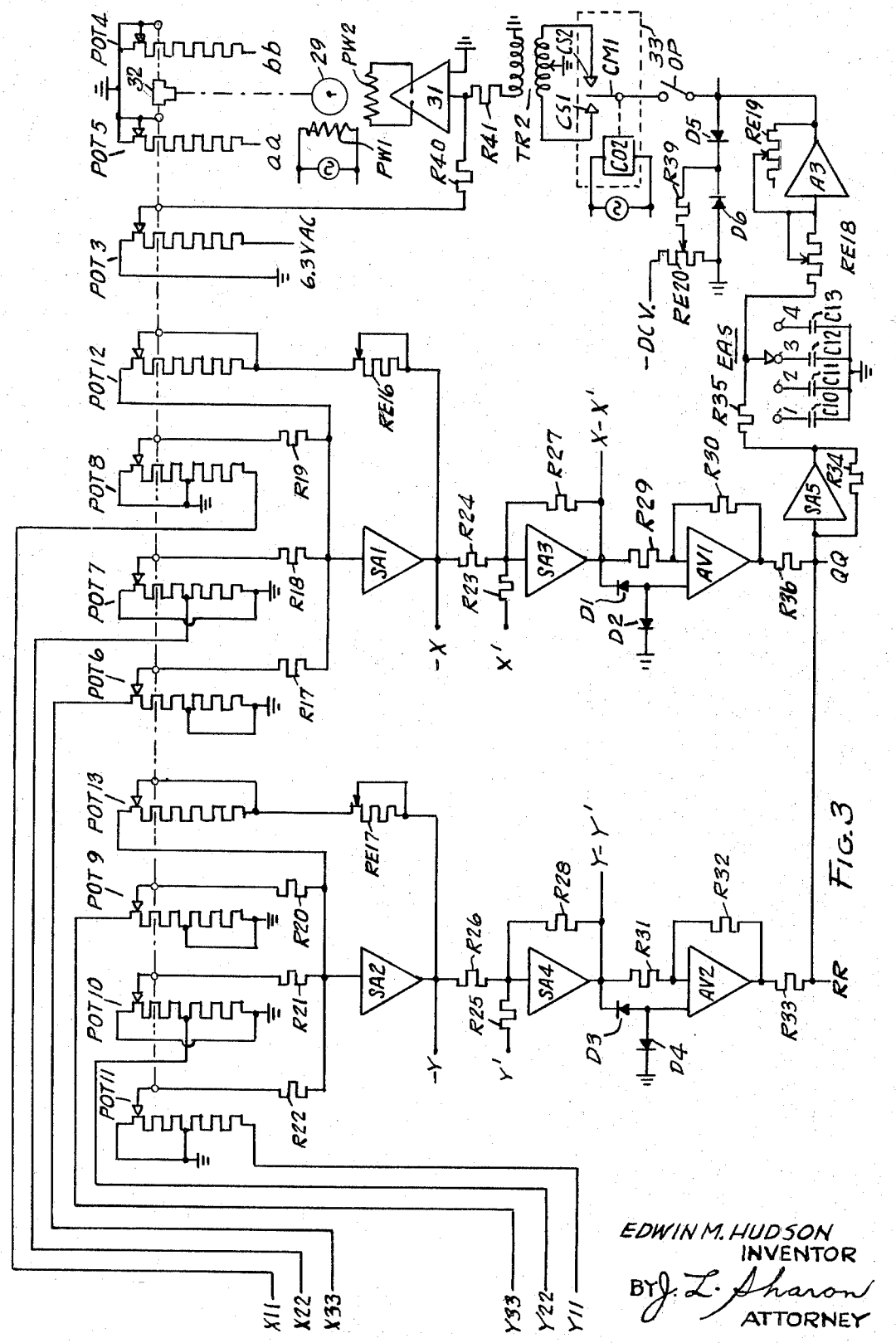
FIGURE 3 is a schematic block diagram of circuits for detecting signals representative of errors committed by an operator and also includes a schematic block diagram of servo circuitry employed in utilizing these signals to effect alternations in simulator parameters.

In FIGURES 2 and 3 there is indicated the apparatus for generating the simulated response to the operator's control actuations and for changing the characteristics of the simulated vehicle in response to errors arising from the operator's efforts to control the simulated vehicle in accordance with changes in the target's location. As shown in FIGURE 2 a source of unidirectional voltage, which may be of the order of 24 volts arranged to give positive and negative polarities to ground, is connected through reversing switches PS1, PS2 to the stationary contacts of potentiometers POT1, POT2 associated with the "X" and "Y" axes, respectively. Inasmuch as the apparatus for both axes is the same, only that shown for the "X" axis will be described.

The operator's control instrumentality is shown here as a control stick 11 mechanically connected to control the positions of the movable contact or brush of each potentiometer to select potentials that may be either positive or negative with respect to ground. This mechanical coupling, which is available as a commercial unit, is arranged such that when the control stick is displaced along a quadrant line, (i.e., 90°, 180°, etc.) only one of the potentiometer movable contacts is displaced; but if the control is otherwise actuated both movable contacts are displaced by amounts corresponding to the "X" and "Y" axes vectors of movement. Thus, for certain type of control stick actuation one potentiometer may supply a positive potential and the other supply a negative one.

The potential from the movable contact of potentiometer POT1 is supplied through adjustable input resistor RE6 to high gain D.C. amplifier INT1 which is arranged as an integrator by its feedback capacitor C4. The actual values of resistor RE6 and capacitor C4 will depend upon the characteristics of the vehicle being simulated. In this described tested embodiment RE6 was a 2.6 megohm rheostat and capacitor C4 was 1 mf. The integrated output is applied to the voltage divider comprising resistors R5, R6 which together with the gain of inversion amplifier INV1 are so proportioned as to give unity gain and effectively result in only 180° phase shift of the applied signal. Adjustable feedback resistor RE12, which may suitably be about 1.1 megohms is connected to switch arm SS1 for connection to contact 50 for positive feedback and to contact 52 for negative feedback to the input of integrating amplifier INT1. The inverted signal from amplifier INV1 is supplied through input resistor RE8 to integrating amplifier INT3 and inversion amplifier INV3 where it is again integrated and inverted in the manner that has been described for the first stage. Resistor RE8 and capacitor C6, as well as resistor RE10 and capacitor C8 in the circuit of integrating amplifier INT5, may suitably be valued at 2.6 megohms and 1 mf., respectively. In a manner similar to that explained for amplifier INT1, a loop including resistor RE13, similar in value to that of RE12, is arranged for either regenerative or degenerative feedback to the input of integrating amplifier INT1. Integrating amplifier INT5 and inversion amplifier INV5 are similar in construction and action to the previously explained units and provide the third stage of integration in the simulation of a vehicle having a third order of control. Manually actuated Integration Selection switch ISS, having three levels or wafers, is connected to the output terminals of the three inversion amplifiers INV1, etc. and in conjunction with the previously explained apparatus provides an arrangement for simulating the characteristics of first, second or third order of control vehicles.

It is to be understood that an additional stage of integration and inversion would be added following inversions amplifier INV5 if a system or vehicle having a fourth order of control were being simulated. Whether a third feedback loop would be added would depend upon the degree of stability of the vehicle being simulated. For the great majority of practical systems or vehicles the two loops including resistors RE12 and RE13 are believed to be sufficient.

From the foregoing, it will be understood that with switch ISS connected as shown the simulated response to control actuations will appear on output leads X11, Y11 for a first order machine on leads X22, Y22 for a second order one and on leads X33, Y33 for a third order machine. Before leaving FIGURE 2 it may be noted that terminals 21, 22, 23, 24 and their counterparts terminals 25 to 28 in the Y axis branch provide means for cross-connecting the two branches to give effect to axis cross-coupling, such as would exist in a machine where actuation of a control along one axis only produces a response along the complementary axis. An example might be the loss of altitude that tends to accompany a turn in an aeroplane. These cross-connections have not been shown for the described embodiment in the interest of simplicity of explanation.

Referring to FIGURE 3 it will be seen that potentiometers POT9, POT10, POT11 and POT13 are associated with the Y axis branch and potentiometers POT6, POT7, POT8 and POT12 are included in the X axis branch of the circuit. These may suitably be 50,000 ohm units. As was the case with FIGURE 2, the X and Y axes brances in FIGURE 3 are substantially duplicates and only the X axis apparatus will be explained in detail.

The movable contact of each of these potentiometers is positioned by reversible position motor 29. At the start of an operating session this motor will be actuated by a portion of the 6.3 volt potential derived from potentiometer POT3 to position each movable contact properly for the type of vehicle being simulated. This process will be further explained later. The illustrated positions of these contacts corresponds to the initial condition in simulating a third order of control vehicle. First order of control output lead X11 is connected to the lower terminal of potentiometer POT8. The upper half of the potentiometer is shorted to the ground connection on its midpoint terminal. The midpoint of potentiometer POT7 is connected to the second order of control output lead X22 and its top and bottom terminals are grounded, such that duplicate potentials are produced across the upper and lower halves. Third order of control output lead X33 is connected to the upper terminals of potentiometer POT6, the lower half of which is shorted to ground. Thus as motor 29 progressively lowers the positions of the movable contacts, the input to the summing type operational amplifier SA1 changes progressively from a pure third order of control function to mixed third and second order functions which gradually becomes more weighted to the second order of control as the contacts approach the mid terminal position, at which point only the second order of control is effective. Further such change in the positions of the movable contacts bring them into the lower halves of the potentiometers, of which only potentiometers POT7 and POT8 are effective to deliver second and first order of control function inputs to SA1. When the contacts are positioned at the lower terminal positions only the first order of control is being supplied to SA1.

The outputs of the X and Y axes potentiometers are "summed" in summing amplifiers SA1 and SA2 after passing through the respective input resistors R17–R22 which may be 51,000 ohms each. These amplifiers have resistive feedback loops including 50,000 ohm potentiometers POT12 and POT13 and 100,000 ohm rheostats RE16 and RE17. The movable contacts of these potentiometers POT12, POT13 are also controlled by motor 29 such that as the system steps back from a higher to a lower order of control the amplification factor of the summing amplifier is increased to assist the operator.

The outputs of the summing amplifiers are connected over leads −X, −Y to contacts 8 and 7, respectively, of the Compensatory-Pursuit switch CPS (FIG. 1) for application to the deflection circuits of scope 12 to provide a spot of light on its screen as representative of the vehicle. The outputs of these amplifiers also pass through input resistors R24, R26 of 6.2 megohms before being combined in summing amplifiers SA3, SA4 with the outputs of photocell units PC1–PC2 on leads X', Y' to derive difference voltages X−X' and Y−Y'. Resistors R23 and R25 may suitably be of the order of 1 megohm. These difference voltages are indicative of the degree of error by which the operator fails to position the simulated vehicle in coincidence with the target on the screen of scope 12 i.e. to keep the spot of light in the center of the circle.

The simulation apparatus has the characteristic of reducing its order of control, reducing the degree of movement imparted to the target and increasing the gain of the summing amplifiers SA1, SA2, in conformity with the degree of error between the positions of the target and the simulated vehicle. As this error exceeds a predetermined value the effect is to simplify the operator's task. As the error then decreases the change is opposite in character so as to complicate the operator's task. To accomplish this simplifying function it is desirable to change the positive and negative error signals (X–X' and Y–Y') at the outputs of the summing amplifiers SA3, SA4 into absolute values of negative polarity. This is done in the absolute value operational amplifiers AV1 and AV2, the input resistors R29, R31 of which may be about 510,000 ohms. Direction sensitive networks including unidirectional conducting devices D1, D2 and D3, D4 are also connected between these summing amplifiers and the absolute value amplifiers AV1 and AV2. If the difference voltage at the output of the summing amplifier SA3 (or SA3) is positive with respect to ground potential the signal is blocked by rectifier D1 and passes through the channel of amplifier AV1 which is associated with input resistor R29 and in so doing is reversed in polarity. If it is negative with respect to ground potential the signal passes through rectifier D1 and the channel of amplifier AV1 which is associated with it—in which latter case it is not reversed in polarity. Rectifier D2 (or D4) provides a leakage path to ground for any positive potential output signal which may pass through rectifier D1 (or D3) in its reverse direction. The X and Y axes error signals are combined in summing amplifier SA5, which has two input resistors R33, R36 of about 1 megohm each. A more rigorous solution of the error signals would be to extract the square root of the sum of their squares, however for purposes of simplicity the single summing amplifier is used and for practical purposes has been found to be satisfactory. The output of amplifier SA5 is representative of the instantaneous difference between the required and achieved performance of the operator. In other words, when the operator fails to so move his control element as to cause the simulation apparatus to produce output signals which are counterparts of the signals generated by the function generator shown in the top half of FIGURE 1, amplifier SA5 instantaneously produces output signals representing his failure.

The output of amplifier SA5 may be subject to rapid and relatively large scale fluctuations which, if permitted, could affect adversely the operator's training progression. To counteract this effect and to permit adapting the apparatus to the operator's progress a smoothing network comprising resistor R35, and capacitors C10 to C13 is provided. This network includes switch EAS for selecting manually one or another of the condensers, which with resistor R35 may be so proportioned as to provide a time constant ranging from 3 to 75 seconds. In one tested arrangement a time constant of 25 seconds was found to be satisfactory for the experiment then under consideration. This smoother, or averaged, error indication is connected to input resistor RE18, a 2.1 megohm rheostat, at the input to error amplifier A3, the gain of which is optional according to the degree to which it is desired that the apparatus conform in response to errors. RE19 may be a 3.0 megohm rheostat. The negative going signal from amplifier A3 is connected to the error gate including unidirectional conducting elements D5, D6, the source of negative potential —D.C., rheostat RE20 and resistor R39 which may suitably be 10,000 and 20,000 ohms, respectively. The setting of rheostat RE20 is optional and controls the magnitude of error that is chosen as representing satisfactory performance on the part of the operator. Switch OP is provided to permit attaining a stable condition preparatory to the operator assuming control. When closed, it connects the gated error signal to the movable contact CM1 of interrupter 33, whose actuating coil is energized from an alternating voltage source the phase of which is such as to produce in the secondary winding of transformer TR2 an alternating potential that is 180° out of phase with the alternating potential taken from potentiometer POT3 through resistor R40 of 1 megohm. Resistor R41 may suitably be 1.3 megohms.

The two out of phase potentials are combined in amplifier 31 and supplied to phase winding PW2 of the two phases A.C. motor 29. The rotor of motor 29 is connected through gear reduction unit 32 to drive the movable contacts of potentiometers POT3 through POT13, as is schematically indicated in FIGURE 3. As is indicated in FIGURE 5, this motor may also drive the movable contact of potentiometer POT14 in the circuit of the additive adaptation indicator. As is well known, the potential across winding PW1 is 90° out of phase with the potential derived from amplifier 31.

Gear unit 32 and its conection with the various potentiometers is provided with a manually adjustable stop to limit its movement in response to the potential derived from potentiometer POT3. Thus, by this manual control the simulation can be restricted to any order of control equal to or less than the maximum of which the device is capable.

Potentiometers POT4 and POT5 in being actuated by motor 29 act as variable voltage dividers in conjunction with resistors R1, R2 (FIG. 1) and thereby control the amount of movement that is imparted to the target on the screen of scope 12.

The operation of the apparatus shown in FIGURES 1 to 3 may be visualized from the following short description of operation including the manner in which it is adjusted initially for the simulation of a specified machine, such as, for example, a helicopter which, as stated earlier, is essentially a third order of control craft. One way of doing this is to adjust and readjust the various components while an operator, experienced on the type of machine to be simulated, is attempting to control the movements of the simulated vehicle in accordance with target movements. During this time the adaptive portion of the apparatus is made inoperative by operating switch OP being in its "open" position. At some setting of the values of the components the apparatus will "feel" to respond to control actuation in the same manner as the actual vehicle responds.

To provide the initial adjustments Integration Selection switch ISS is set on position 3 in which position it is effective to supply first, second and third order of control actuations to the remainder of the equipment. Sufficient time is allowed for motor 29 acting under the excitation derived from potentiometer POT3 to drive all potentiometers POT 3 through POT13 to their top or uppermost position. Each input resistor (RE6, RE8, etc.) at the input of an integrating amplifier is adjusted to produce the familiar or customary lag time between control actuation and vehicle response. Feedback switches (SS1, SS2, etc.) are adjusted for positive or negative feedback and the resistors in the feedback loops are adjusted to approximate properly the stability of the simulated craft. The degree of response to control actuation (or gain of the system) is adjusted by proportioning properly adjustable resistors RE16 and RE17 in the feedback loops around summing amplifiers SA1 and SA2. The drive or movement of the target is controlled through adjustment of resistors RE4 and RE5 (FIGURE 1) in the circuit of the photocell units. Compensatory-Pursuit switch CPS will be positioned to engage the right hand set of contacts if the operator's task is to "pursue" the target by attempting to maintain the visual representation of the position of the simulated vehicle in registration with the visual representation of the target. At this point it may be noted that when this switch is positioned to engage the elft set of contacts the target remains stationary and the potentials derived from the photocell apparatus act through the connections X', Y' and X–X', Y–Y' to influence the simulated vehicle's position. In this arrangement it is the operator's task to compensate for those influences by so actuating his control instrument 11 (FIGURE 2) as to generate output response equal to but opposite in sign to those impulses emanating from the photocell equipment (FIGURE 1).

Assume now that the various components have been suitably adjusted to produce the desired "feel" in the control stick corresponding to that which would be experienced in the vehicle being simulated. The training session is started by closing operating switch OP and permitting the trainee to attempt to maintain the visual representation of the simulated position in registration with the target in its movements. If, as may be expected, the trainee is unable to maintain these positions the potentials resulting from his actuation of the control instrument 11 after their passage through the integrating and inversion amplifiers of the X and Y axes branches and the respective potentiometers POT6, etc, are summed in summation amplifiers SA1 and SA2 after which they are returned to switch CPS over leads −X, −Y for actuation of the deflection circuits of scope 12. Simultaneously the varying potentials of the photocells PC1, PC2 are supplied through switch CPS and commutating switch 20 to these same deflection circuits as well as being supplied over leads X', Y' to the inputs of summing amplifiers SA3, SA4 where they are combined with the integrated signals resulting from the control actuations to produce more or less constantly varying values that are indicative of the amount expressed along the X, Y coordinates by which the achieved vehicle position varies from the desired position.

Because of the difference in polarity, or sign, of these combined potentials the process in summing amplifiers SA3, SA4 is essentially a subtraction; however, the output may be either positive or negative with respect to ground potential. If it is positive the signal is passed through input resistors R29, R31 and thence through the positive voltage channel of absolute value amplifiers AV1, AV2. If it happens to be of negative polarity the signal is passed through unidirectional device D1, D3 and thence through the negative polarity channel of these amplifiers. The output of these amplifiers regardless of input polarity is a negative going function which is combined or summed in summing amplifier SA5 to produce a substantially varying value which may fluctuate rather widely and is taken to be representative of the combined vector quantities. This output voltage is smoothed, or averaged in the smoothing network which includes resistor R35 and capacitor C10–C13. Switch EAS is positioned to produce a time constant factor suitable for the desired rapidity of response by which the simulation mechanism adapts itself for increased ease of control. It should be noted that this is a time factor and not a quantity factor. Thus, the amount by which the apparatus adapts itself to conform to the operator's capabilities is controlled by the amount of amplification that is imparted to the smoothed signal by operational amplifier A3, the gain of which is a function of the setting of adjustable resistors RE18 and RE19. This quantity factor is also influenced by the setting of the error gate which includes unidirectional devices D5 and D6. As the negative potential at the junction of these devices is made less negative by adjustment of resistor RE20 the operator is required to more closely conform to the position of the target than would be the case if this potential were lowered to a more negative value. In either event all errors signals (which are of negative polarity) the magnitude of which exceeds the potential of the gate are passed through transformer TR2 to generate an alternating potential the magnitude of which represents the degree of error above the gate or threshold and which is opposite in phase to an alternating potential derived from potentiometer POT3. The sum of these potentials is passed through amplifier 31 to control phase winding PW2 of motor 29. Depending upon which potential is greater motor 29 will turn clockwise or counterclockwise to drive gear unit 32 in a direction, in this assumed case, to reduce the setting of the variable potentiometers POT3 through POT13. At this point it may be noted that if no error voltage is emanating from transformer TR2 the potential derived from potentiometer POT3 is connected such as to cause motor 29 to turn in a direction to move the movable contacts of the potentiometers to the maximum position permitted by the manually adjustable stop or check which controls the movement of gear unit 32 and its connection.

From this previous description it will be understood that as the operator fails to control the simulated position in registration with the target position the adaptive potentiometers are moved to positions corresponding to lesser orders of control corresponding to more simplified forms of vehicles. Simultaneously the gain potentiometers POT12 and POT13 are increased in effective value to increase the gain of summation amplifiers SA1 and SA2 and thus increase the gain of the system by making the apparatus more responsive to control actuations. Simultaneously the degree by which the target is driven is reduced by the effective reduction of resistance inserted through potentiometers POT4 and POT5 thus again aiding the operator in his task. This process is repetitive until such time as the magnitude of the alternating potential derived from transformer TR2 no longer exceeds the potential derived from potentiometer POT3. As the operator's dexterity improves his error potential will gradually drop below that of the one derived from POT3 and the adaptive process will reverse with the effect that the dictated task becomes slightly more difficult. Alternatively by a succession of adaptive steps toward simplification and complication of the simulated vehicle the operator acquires dexterity sufficient to control the simulated position within the desired degree of approximation of the target. At this point the error potentials equal or drop below the threshold potential of the error gate and no further potentials are supplied through transformer TR2. It will be observed that one method of training an operator will be to simulate a vehicle which is somewhat more difficult to control than is the actual vehicle for which the operator is being trained. Thus, when his errors on this more complicated vehicle reach the threshold of the gate he may be said to be overtrained for the actual vehicle. The apparatus indicated in FIGURE 5 may be usefully employed when so training an operator.

In the apparatus of FIGURE 5 the movable contact of potentiometer POT14 is mechanically coupled to gear box 32 in the same manner as potentiometers POT3, etc. The stationary terminals of POT14 are connected to ground and to a unidirectional potential. The electrical output derived from the movable contact is connected through a high gain D.C. amplifier INT7 arranged as an integrator to a meter 38 used to indicate additive adaptation. This indicator gives a reading of the summation of adaptation that the apparatus undergoes during any predetermined interval and can be used to indicate the proficiency a trainee has attained in acquiring the desired dexterity. For this purpose the apparatus is adjusted to simulate a vehicle more difficult to control than is the actual vehicle for which the operator is being trained. The point on potentiometer POT14 at which the movable contact is so positioned is grounded when the apparatus is so adjusted. The apparatus is then reset to simulate the vehicle for which the operator is being trained and the motor 29 is locked in that position to remain there throughout the time equivalent of a training session. The reading on the additive adaptation indicator at the end of the equivalent time represents the amount of adaptation the apparatus would have undergone if a trainee had operated the simulator in a manner corresponding to perfect control of the vehicle for which he is being trained for the entire training session. This value becomes the "norm" for judging whether the operator has acquired the desired dexterity. A reading of a lower magnitude registered by a trainee for a training session indicates that he has acquired more than the required dexterity and that his training could be ended. The "norm" value can be used as a threshold to control the actuation of a visual or audible indicator whenever the adaptive assist that is given a trainee becomes less than the "norm" if this is desired.

In order to understand how the invention may be utilized as a design tool reference is made to FIGURE 4 in which there is shown apparatus for use with an adaptive simulator of the general type that has been described to produce a system which automatically adjusts its parameters to permit optimum performance characteristics. In the previously described simulator a single servo controlled a number of parameter controlling potentiometers simultaneously. In this self-optimizing system it is desirable to split these controls such that an operating parameter can be varied independently of the others. To do this there will be provided as many servo drives as parameters to be varied. It is to be understood that the X and Y axes errors may be considered separately or combined. If measured and controlled separately for each axis there will be provided one set of equipment as shown in FIGURE 4 plus an additional set of servo drives for each parameter that is to be controlled in the other axis. For purposes of simplicity the arrangement of FIGURE 4 will be explained as controlling the X axis parameters—it being understood the Y axis components would be controlled in a similar manner.

In the system previously described, the output terminals of absolute value amplifiers AV1 and AV2 were connected to summation amplifier SA5 in order to combine the errors in both channels and use this combination as the instantaneous error signal. In the self-optimizing system to be explained these outputs are maintained in separation, and are sequentially connected to the error feed switch contacts EFS1 and EFS2 through axis switch contacts AXS1 and AXS2. The axis switch AXS may be any suitable type switch that is actuated by the stepping switch means to connect the Y axis error signals through contacts AXS2 at the same time the stepping switch means 72 moves its contact from the X axis servos to those corresponding to the Y axis parameters.

Let it be assumed that the self-optimizing system is started in operation with the memory gate switch MGS and the direction memory switch DMS in the deenergized state, the error feed switch EFS and the time selection switch TSS in the energized state, and the servos set at some arbitrary position. As the operator begins to track the target the output of the X axis absolute value amplifier AV1 is fed through line QQ, axis switch contact AXS1, and error feed switch contact EFS1 to integration amplifier INT8. Since the output of amplifier AV1 is instantaneous error signals, the output of amplifier INT8 is integrated instantaneous error signals. These signals pass through contact MGS1 and, if large enough, through gate A to be stored in memory A. Gate A may be any suitable type which will pass a signal above a predetermined value and reject all signals of lesser magnitude. Memory A is a quantity retentive unit which may take the form of a low leakage capacitor. During this tracking operation power is supplied to timing means generator 39 through contacts EFS2 and TSS1. After a pre-set interval generator 39 produces a first output signal on lead 60 which operates switch MGS to its energized position, excites "negative" signal generator 41 through the line including contact DMS1 and holds switch MGS energized until "negative" signal generator 41 has produced its pulse output.

Upon excitation the "negative" signal generator 41 transmits a "negative" output signal through contact DMS8 to Servo I causing it to move in a counterclockwise direction to change one of the simulator parameters.

When switch MGS is set it opens contacts MGS1 and closes contacts MGS2 to shift the integrated error signals from memory A to memory B. After a second pre-set period of time, equal to the first period, generator 39 produces on lead 62 a second output signal which resets switch EFS to its de-energized position, thereby opening contacts EFS1, and EFS2 and closing contact EFS3.

Upon opening, contacts EFS1 precludes the integration and storage of additional errors through integrating amplifier INT8. Contact EFS2 opens to de-energize timing means generator 39. Contact EFS3, by closing, completes the circuit to subtractor 43 where the signal in memory B is always subtracted from the signal in memory A.

The signal output of subtractor 43 will be negative if the error signal stored in memory B is larger than that stored in memory A; and positive if vice-versa. A negative signal indicates that the movement of Servo I has increased the difficulty of operating the simulator and, therefore, this movement was in the wrong direction. A positive signal indicates the movement of Servo I was in the correct direction.

If the output of subtractor 43 is a negative signal it passes through contact DMS3 and rectifier D7 to inverting amplifier INV7 where it is inverted to a positive signal to excite "positive" signal generator 45.

Upon excitation, the "positive" signal generator 45 produces a "positive" signal. A portion of this signal passes through contact DMS7 to set switch DMS to its energized position thereby opening contact DMS7 and closing contacts DMS10. When contacts DMS10 close the "positive" signal is fed to the brush of the stepping spitch 72 to cause Servo I to be moved in a clockwise direction. The "positive" signal output of 45 is also passed through inverting amplifier INV8 where it is inverted to a "negative" signal. This "negative" signal passes to switch MGS to re-set it in the de-energized position and also passes to switch EFS to set it in the energized position.

With switch MGS in the de-energized position and switch EFS in the energized position the system is again ready to store the operator's errors in memory A for another predetermined time interval as generated by timing generator 39.

After another first pre-set period of time, during which memory A again stores integrated error signals, another change is made in the position of Servo I. This change in position is in the clockwise direction since contact DMS2 is now closed and a first output signal from the timing means generator 39 excites the "positive" signal generator 45 through this contact. After the second preset period of time elapses during which error signals are collected in memory B, memory B is again subtracted from memory A to obtain an output signal from subtractor 43 in the previously described manner.

Let it be assumed that this output from subtractor 43 is a positive signal. This passes through now closed contacts DMS4 and rectifier D8 to positive gate 47. If this signal is large enough it passes through this gate and resets time selection switch TSS to the de-energizes position while, at the same time, it excites "positive" signal generator 45 to move Servo I in the clockwise direction and to recycle the system for another trial.

When switch TSS is re-set contact TSS1 is disengaged and contact TSS2 is engaged. This causes the timing means generator 39 to operate at shortened first and second pre-set periods of time. These make the time of trials shorter and thereby produce more changes in Servo position during the same time interval. Shortened pre-set periods of time are possible when the output signals of subtractor 43 are large positive signals because such signals mean that large differences are occurring between the signals of memory A and those of memory B. However, short trials make it possible to obtain only a rough estimate of optimum performance. Therefore, when positive output of the subtractor falls below a predetermined value switch TSS is again set in the energized position to permit longer periods of integrated error signal storage and in order to obtain more accurately the position for optimum performance.

This manner of trial and error movement of Servo I continues until a positive value output signal of 43 is too small to pass through the "positive" gate 47 or the "negative" gate 49. This signal does pass through rectifier D11 and inverting amplifier INV10 where it is inverted into a negative signal which passes to stepping switch gate 51. Gate 51 is set to allow signals less negative than a preset negative value to pass. Any signal passing this gate advances the stepping switch 72 to the next servo; sets switch TSS in the energized position, if necessary; re-sets switch MGS in the de-energized position; and sets switch EFS in the energized position, thereby preparing the system for adjustment of a different parameter; that one associated with Servo II in this explanation.

This trial and error procedure is then repeated with Servo II, III, etc. until all parameters it is desired to vary have been varied. The stepping switch is then automatically returned to Servo I and the process repeated until all parameters are set at values which cause the simulator to give optimum performance characteristics.

It is to be realized that the foregoing description has been by way of illustration only, and that more or fewer parameters can be changed as may be desired. Thus under certain conditions it may be desirable to arrange rheostats RE6–RE15 in such manner that they may also be changed by motor 29 (FIG. 3). It may also be desirable to provide inter axis coupling by providing fixed conductive cross connections between certain of junctions 21, 22, etc. These optional variations will be a matter of choice depending upon the conditions to be simulated and the factors affecting them.

It is not intended to set forth all the variations that may be made, but it is contemplated that many of the features of the invention disclosed may be carried out in other ways and may be used in connection with apparatus and circuits different from those specifically described and that many apparently widely different embodiments of the invention can be made without departure from the spirit and scope of the invention. It is therefore intended that all matter contained in the above description or shown in the accompanying drawings shall be interpreted as illustrative and not in a limiting sense.

What is claimed is:

1. Apparatus simulating a device having a plurality of control characteristics and a control element movable by an operator for controlling the operation of said device, said apparatus comprising a control mechanism simulative of the device control element; first means responsive to movement of said control mechanism for generating first signals representative of the kind and degree of said movement; second means including a plurality of components selected for inclusion and arranged in accordance with their respective properties and magnitudes so that they represent certain of the control characteristics of said device; said second means providing second signals in response to said first signals, said second signals being indicative of the output response to the device to movement of its control element in a manner similar to movement of the control mechanism of said apparatus; third means generating third signals, counterparts of which it is desirable to have said second means produce as output response indicating signals in response to first signals generated by movement of said control mechanism; fourth means detecting deviations between said third signals and said output response indicating signals; and fifth means responsive to said deviations for modifying the arrangement of the components of said second means to alter the output response indicating signals the second means produces, the apparatus thereby simulating a different device having different control characteristics.

2. Apparatus according to claim 1 in which said fifth means in response to said deviations also modifies said third means to alter said third signals.

3. Apparatus simulating a machine which operates in response to control actuations imparted thereto by an operator, said apparatus including first means capable of having control actuations imparted thereto of the same character as those which can be imparted to the machine being simulated; second means generating signals in response to control actuations imparted to said first means, said signals being indicative of the response of the machine being simulated to control actuations imparted to it of the same kind as imparted to said first means; third means generating signals indicative of changes in the desired condition of the machine being simulated, and fourth means responsive to differences between the signals generated by said third means and the response indicating signals generated by said second means as the result of control actuations imparted to said first means, said fourth means modifying the component structure of said second means thereby changing the character of the response indicating signals generated in response to control actuations.

4. Apparatus simulating a first mechanism having a plurality of performance characteristics and operable automatically to vary its structure thereby to simulate a second mechanism having a different plurality of performance characteristics, said apparatus comprising control means actuatable by an operator, means generating sequentially changing signals representing maneuvers to be performed by said simulated mechanisms, means generating a series of signals in accordance with actuations imparted by said operator to said control means in attempting to cause said simulated first mechanism to perform said maneuvers, electrical networks simulating said plurality of performance characteristics of said first mechanism and effective to operate on said series of signals in the same manner and degree as said simulated first mechanism reacts to input control signals, said networks producing instantaneous output response signals of said apparatus to said imparted actuations, said output response signals simulating the actual output responses of said first mechanism to control actuations of the same kind and degree, means comparing said sequentially changing signals and said output response signals and producing difference signals whose values represent degrees of failure of said operator to cause said simulated first mechanism to perform said maneuvers, and means controllable by said difference signals and effective to alter said electrical networks to vary the simulation of said performance characteristics to a degree corresponding to those of said second mechanism, said second mechanism being more readily controllable by said operator.

5. Apparatus simulating a first mechanism having a plurality of performance characteristics and operable automatically to vary its structure thereby to simulate a second mechanism having a different plurality of performance characteristics, said apparatus comprising control means actuatable by an operator, means generating sequentially changing signals representing maneuvers to be performed by said simulated mechanisms, means generating a series of signals in accordance with actuations imparted by said operator to said control means in attempting to cause said simulated first mechanism to perform said maneuvers, electrical networks simulating said plurality of performance characteristics of said first mechanism and effective to operate on said series of signals in the same manner and degree as said simulated first mechanism reacts to input control signals, said networks producing instantaneous output response signals of said apparatus to said imparted actuations, said output response signals simulating the actual output responses of said first mechanism to control actuations of the same kind and degree, means comparing said sequentially changing signals and said output response signals and producing difference signals whose values represent degrees of failure of said operator to cause said simulated first mechanism to perform said maneuvers, and means controllable by said difference signals and effective to alter said means generating said sequentially changing signals and to alter said electrical networks so that the simulation of at least one of said performance characteristics is varied thereby to simulate a second mechanism until said difference signals ultimately assume predetermined values.

6. Apparatus having components of specified values representing a plurality of performance characteristics of a manually controllable simulated device and operable automatically to vary the values of its components thereby to represent a different plurality of performance characteristics, said apparatus comprising manually operable control mechanism similar in operation and results to that of said simulated device, first generating means providing variable signals representing desired actuations to be imparted to said control mechanism by said operator, second generating means providing a series of signals in accordance with actuations imparted by an operator to said control mechanism, electrical circuitry including the analog of said simulated device for transforming said series of signals into output response signals of said apparatus to said imparted actuations, means comparing said variable signals and said output response signals and providing signals representative of the difference between said compared signals, and means responsive to said difference signals and effective to alter said analog to vary alternately at least two of said simulated performance characteristics until said difference signals ultimately assume predetermined values.

7. Apparatus having components of specified values representing a plurality of performance characteristics of a manually operable simulated device and operable automatically to vary the values of its components thereby to represent a different plurality of performance characteristics, said apparatus comprising manually operable control mechanism similar in operation and results to that of said simulated device, first generating means providing variable signals representing desired actuations to be imparted to said control mechanism by an operator, second generating means providing a series of signals in accordance with actuations imparted by said operator to said control mechanism, electrical circuitry including the analog of said simulated device for transforming said series of signals into output response signals of said apparatus to said imparted actuations, means comparing said variable signals and said output response signals and providing signals representative of the difference between said compared signals, and means responsive to said difference signals alternately varying said first generating means and said analog in at least one of said performance characteristics until said difference signals ultimately assume predetermined values.

8. Apparatus simulating a first device characterized by a plurality of performance parameters and operable to vary automatically its component values thereby simulating a different device characterized by another plurality of performance parameters, said apparatus comprising control means positionable by an operator, means generating signals indicative of maneuvers to be performed by said operator by changing the position of said control means, means responsive to changes in position of said control means and providing a series of signals indicative of such changes, means simulating said first device for transforming said series of signals into simulated output response signals of said device in accordance with changes in position of said control means, means deriving signals representative of the difference between said generated signals and said simulated output response signals, and means controlable by at least some of said difference signals and effective to vary said simulating means simultaneously in at least two of said performance parameters and thereby to simulate a different device until said difference signals ultimately assume predetermined minimum values.

9. Apparatus simulating a first device characterized by a plurality of performance parameters and operable to vary automatically its component values thereby simulating a different device characterized by another plurality of performance parameters, said apparatus comprising control means positionable by an operator, means generating signals indicative of maneuvers to be performed by said operator by changing the position of said control means, means responsive to changes in position of said control means and providing a series of signals indicative of such changes, means simulating said first device for transforming said series of signals into simulated output response signals of said device in accordance with changes in position of said control means, means deriving signals representative of the difference between said generated signals and said simulated output response signals, and means controllable by at least some of said difference signals and effective to vary simultaneously said generating means and said simulating means in at least one of said performance parameters until said difference signals ultimately assume predetermined minimum values.

10. Apparatus simulating a first mechanism representable by a plurality of performance characteristics and operable to vary automatically its components thereby to simulate a second mechanism representable by a different plurality of performance characteristics, said apparatus comprising control means actuatable by an operator, a function generator providing continuously changing potentials representing maneuvers to be performed by said simulated mechanisms, a voltage supply, a potentiometer connected to said control means and arranged as a voltage divider to provide potentials representative of actuations imparted by said operator to said control means in attempting to perform said maneuvers, electrical circuitry including at least one integrating network arrangeable as the analog of said plurality of performance characteristics of said mechanisms for transforming said potentials representative of actuations into output potentials representing the output responses of said mechanisms, a summation amplifier providing potentials representative of the differences between said continuously changing potentials and said output potentials, the values of said difference potentials representing the degrees of failure of said opeartor in performing said maneuvers, a positioning device controllable by said difference potentials and effective to alter said integrating network to vary said performance characteristics until said difference potentials ultimately assume predetermined values, a gate circuit permitting difference potentials greater than a preset minimum to control said positioning device, and a display device presenting a representation of said continuously changing potentials and said output potentials to said operator enabling him to more clearly understand said maneuvers and his degrees of failure.

11. Apparatus operable in at least one axis of operation in response to input control manipulations of an operator comprising; a controllable device actuatable by said operator in a number of axis of actuation equal to the number of axes of operation for producing varying input signals one each representative of actuations made by said operator in one said axis; alterable electrical circuitry connected to said controllable device including one electrical network associated with each said axis of actuation, each said electrical network receiving said varying input signals of said axis associated therewith and operating on said received input signal for producing an output signal in response thereto lacking conformity with said received input signal; a display mechanism connected to each said electrical network for receiving said output response signal produced by each said network and for displaying a representation of said output response signal associated with each said axis of actuation; a function generator operable to produce a varying output signal in each said axis of actuation; a summing network for deriving a signal representing in each said axis of actuation the difference between the function generator output signal in that axis and the output response signal associated with said axis; a smoothing circuit smoothing said difference signals over a given time period; and a positioning device operative in response to said smoothed difference signals for altering said electrical circuitry to cause each said output response signal to be more in conformity with its corresponding input signal.

12. Apparatus operable in a plurality of axis of operation in response to input control manipulations of an operator comprising; a control member connected to a voltage source and movable by said operator in a number of axes of movement corresponding to the number of axes of operation for producing a plurality of varying potentials, each said varying potential representing the movement of said control member in one said axis of movement; electrical circuitry connected to said control member including a plurality of alterable networks one network for each said axis of movement, each said network receiving the varying potential of said control member representing the movement of said control member in the axis of movement associated with said network, each said network including at least one stage of energy storage and at least one motor driven potentiometer for producing in response to its received varying potential an output signal lacking conformity with said received potential; a function generator operable to produce a plurality of varying signals one for each axis of movement to which it is desired to have said network output signal in said corresponding axis conform; an oscilloscope employed as a display device connected to each said electrical network and to said function generator for receiving said network's output response signals and said plurality of function generator signals and for displaying a representation of each said signal; a summing network connected to said function generator and each said electrical network for deriving a signal representing the difference in each said axis of movement between the function generator signal in that axis and the corresponding network output response signal in that axis; a resistance-capacitance circuit connected to said summing network for smoothing said difference signals over a predetermined period of time; and a positioning motor connected to said resistance-capacitance circuit and responsive to said smoothed difference signals for driving each said motor driven potentiometer to alter each said network, whereby the oscilloscope displayed signals are more in conformity with each other.

13. Apparatus operable in at least one axis of operation in response to an operator's input control manipulation in a number of axes of manipulation corresponding to the number of axes of operation, comprising; a control stick device connected to a source of potential and movable by said operator in a number of axes corresponding to the number of axes of operation for producing at its output circuit a varying input potential for each axis of movement representing the degree of movement of said device in said axis; electrical circuitry electrically connected to the output circuit of said control stick device including a number of alterable networks one for each said input potential, each said network including at least one integrating amplifier stage and at least one motor operated potentiometer for altering said network, each said network operating upon its corresponding input potential to provide a varying output signal differing from said input potential; a function generator operable to provide a number of varying signals one for each axis of movement to which it is desirable to have each network output signal in the corresponding axis conform, said function generator including a motor operated potentiometer operable to alter the magnitude of said varying signals; a cathode ray tube oscilloscope employed as a display device connected to each said network and to said function generator for receiving said network's output response signal and said function generator signals and for displaying a representation of each said signal; a summing network connected to said function generator and each said electrical network for deriving a signal representing the difference in each said axis of movement between the function generator signal in that axis and the corresponding network output response signal in that axis; a resistance-capacitance circuit connected to said summing network for smoothing said difference signals over a predetermined period of time; a switch connected to said resistance-capacitance circuit for varying the time constant of said circuit; and a positioning motor connected to said motor operated potentiometers and to said resistance-capacitance circuit and responsive to said smoothed difference signals for positioning each said motor operated potentiometer to alter each said network and the magnitude of said function generator signals whereby the oscilloscope displayed signals are more in conformity with each other.

14. Apparatus operable in an X axis and a Y axis of operation in response to input control manipulation of an operator comprising; a control column device connected to a source of direct current potential and movable by said operator in axes corresponding to said X and said Y axes of operation for producing at an output circuit corresponding to said X axis and an output circuit corresponding to said Y axis varying potentials representing the degree of movement of said control column in the respective axis; two electrical networks each connected to one said output circuit, each said network including a plurality of stages having an integrating amplifier and an inverting amplifier connected in that order at least one of the stages of each network including a feedback loop to the input circuit of the integration amplifier of one of the stages, said feedback loop having a switch for connecting said feedback loop to the output circuit of the integrating amplifier or the output circuit of the inverting amplifier of the stage including said loop; a motor driven potentiometer connected to the output circuit of the inverting amplifier of each stage; each said network operating upon the varying potential of the output circuit to which it is connected to provide a varying output signal; a function generator having two input circuits and output circuits, each said output circuit providing an alterably varying potential, one said potential being associated with the X axis of operation, the other with the Y axis, it being desirable to have said operator so move said control column as to have the output signal of the network corresponding to the X axis conform to said one varying potential associated with the X axis and to have the output signal of the network corresponding to the Y axis conform to said other varying potential associated with the Y axis; two motor operated potentiometers one each connected in each input circuit of said function generator; a cathode ray tube oscilloscope having a horizontal axis deflection circuit and a vertical axis deflection circuit employed as a display device and connected to each said network and said function generator; said network output signal corresponding to the X axis and said function generator potential associated with said X axis being received in said horizontal axis deflection circuit to be displayed thereby; said network output signal corresponding to the Y axis and said function generator potential associated with said Y axis being received in said vertical axis deflection circuit to be displayed thereby; each said network having a first summation amplifier with a feedback circuit having a motor operated potentiometer therein; a second summation amplifier connected to the output circuit of each first summation amplifier and the respective output circuits of the function generator for deriving a signal representing the difference in each axis of operation between the function generator signal in that axis and the corresponding network output signal in that axis; a resistance-capacitance circuit having a selection switch for selecting the time constant of the circuit connected to said second summation amplifier for smoothing said difference signals over a preselected time period; an operational amplifier with a variable gain for amplifying said smoothed difference signals; and a positioning motor mechanically connected to each said motor operated potentiometer and electrically connected to said operational amplifier and operable in response to said amplified smoothed difference signals for positioning each said motor operated potentiometer to vary the resistance of said potentiometer whereby the operator can more easily conform the network output signals to the function generator output potentials.

15. Apparatus operable in two axes of operation in response to input control actuation of an operator comprising; an oscilloscope having a horizontal axis deflection circuit and a vertical axis deflection circuit employed as a display device; a signal generator with two output signal circuits each providing an output signal, one said circuit connected to said horizontal axis deflection circuit, the other said circuit connected to said vertical axis deflection circuit, said signals causing a circle to be displayed on said oscilloscope; a potential generator having two input circuits and two output circuits, each said output circuit providing an alterably varying potential, one said output circuit connected to said horizontal axis output circuit of said signal generator, the other said output circuit connected to said vertical axis output circuit of said signal generator, whereby motion is imparted to said circle when displayed on said oscilloscope, said motion in the horizontal and vertical axes being proportional to the magnitude of said output potentials in the output circuits connected to said axes; a control member movable by an operator about two axes, one said axis corresponding to the horizontal axis of said oscilloscope, the other said axis corresponding to the vertical axis of said oscilloscope; said control member connected to two output circuits of a potential source for varying the potential of each said output circuit according to the magnitude of the motion imparted to said control member by said operator about the horizontal and vertical axes, respectively; two electrical networks each connected to one said output circuit to which said control member is connected, each said electrical network including a plurality of cascaded stages, each stage including an integrating amplifier and an inverting amplifier connected in that order; four single pole double throw switches, one associated with each of the first two stages of each network, the common terminal of each said switch being connected through a variable resistor to the input circuit of the integrator of the first stage of the network with which said switch is associated, one contact of each said switch being connected to the output circuit of the integrator of the stage with which said switch is associated, the other contact being connected to the output circuit of the inverter of the stage with which it is associated; a positioning motor; a plurality of grounded potentiometers each having an input and an output circuit, the output circuit of each potentiometer including its sliding brush connected to and positionable by said positioning motor, one said potentiometer associated with each said stage of each network, the input circuit of each said associated potentiometer connected to the stage with which it is associated; a first summation amplifier associated with each said network, the input circuit of each amplifier associated with a network being connected through an input resistance to the sliding brush of each said potentiometer associated with said network, the grounded connections and the input circuit connections of the potentiometer connected to each said amplifier being so arranged that as the positioning motor moves from one final position in a given direction toward the opposite final position the input signals to each said amplifier progressively change from the output signal of the final stage through signals including portions of the output signals of two adjacent stages and the output signal of each other stage to the output signal of only the first stage; two said plurality of positionable potentiometers each one connected between the input circuit and the output circuit of one said first summation amplifier, the sliding brush on each said potentiometer being so connected as to vary its resistance between said input and said output circuit of each said amplifier from a minimum to a maximum value as said positioning motor moves from said one final position to said other final position; the output circuit of said summation amplifier connected to the network associated with said horizontal axis being connected to said horizontal axis deflection circuit, the output circuit of said summation amplifier connected to the network associated with said vertical axis being connected to said vertical axis deflection circuit, whereby said oscilloscope displays the motion imparted by said operator to said control member; a second summation amplifier associated with each said first summation amplifier the input circuit of one said second summation amplifier being connected to the output circuit of the first summation amplifier associated with said horizontal axis and the output circuit of said potential generator associated with said horizontal axis, whereby the output signal of said one second summation amplifier is proportional to the difference between the potentials of its input circuit, the input circuit of the other said second summation amplifier being connected to the output circuit of the first summation amplifier associated with said vertical axis and the output circuit of said potential generator associated with said vertical axis, whereby the output signal of said other second summation amplifier is proportional to the difference between the potentials of its input circuit; a third summation amplifier connected to the output circuits of said second summation amplifiers combining said output signals of said second summation amplifiers; an electrical network connected to said output circuit of said third summation amplifier, said electrical circuit including a variable time constant resistance-capacitance network for smoothing said third summation amplifier output signals and an operational amplifier with variable gain for amplifying said third summation amplifier output signals, said electrical circuit being biased to permit amplified smoothed output signals of said third summation amplifier only larger than a predetermined minimum to pass through it, said output circuit of said electrical network being connected to said positioning motor, said amplified smoothed output signals larger than said predetermined minimum causing said positioning motor to move in said given direction, two of said plurality of positionable potentiometers being connected in the input circuits of said potential generator to cause the output potentials of said generator to be decreasingly altered as said positioning motor moves in said given direction; and one of said plurality of positionable potentiometers being connected from a voltage source to said positioning motor to cause said motor to move in the direction opposite to said given direction when the magnitude of the voltage from said voltage source to said motor exceeds the amplified smoothed output signal of said third summation amplifier.

16. Apparatus useful in designing a device to be controlled by an operator using a control mechanism, comprising; a control mechanism similar to that of said device and manipulatable by said operator in a manner similar to the manner in which said device control mechanism is manipulatable; means responsive to manipulations imparted by said operator to said control mechanism for producing signals representing the kind and degree of said manipulations; electrical circuitry means including alterable components connected to said signal producing means for receiving said produced signals and arranged to provide output signals representing the actual output response of said device to similar manipulations imparted to said device control mechanism; means generating signals to which it is desired to have the operator conform the output signals of said electrical circuitry means by manipulating said control mechanism; a display device connected to said electrical circuitry means and said signal generating means for receiving said output signals and said generated signals and for displaying a representation of each; means coupled to said electrical circuitry means and said signal generating means for receving said output signals and said generated signals and for providing difference signals whose values represent the degrees of failure of the operator to conform said output signals to said generated signals; and means responsive to said difference signals for altering the alterable components in said electrical circuitry means until said difference signals attain a predetermined value.

17. Apparatus useful in designing a device to be controlled by an operator using a control mechanism, comprising; a control mechanism similar to that of said device and manipulatable by said operator in a manner similar to the manner in which said device control mechanism is manipulatable; means responsive to manipulations imparted by said operator to said control mechanism for producing signals representing the kind and degree of said manipulations; electrical circuitry means including alterable components connected to said signal producing means for receiving said produced signals and arranged to provide output signals representing the actual output response of said device to similar manipulations imparted to said device control mechanism; means generating signals to which it is desired to have the operator conform the output signals of said electrical circuitry means by manipulating said control mechanism; a display device connected to said electrical circuitry means and said signal generating means for receiving said output signals and said generated signals and for displaying a representation of each; means coupled to said electrical circuitry means and said signal generating means for receiving said output signals and said generated signals and for providing difference signals whose values represent the degrees of failure of the operator to conform said output signals to said generated signals; means responsive to said difference signals for providing alterations in said alterable components in said electrical circuitry means; means responsive to an increase in said difference signals after an alteration of one kind for causing said alteration providing means to provide another kind of alteration; and means responsive to the attainment of a predetermined condition in said difference signals for ceasing the operation of said alteration providing means.

18. Apparatus useful in designing a device to be controlled by an operator by manipulation of a control member comprising; a control member similar to that of said device and manipulatable by said operator in a number of axes corresponding to those in which said device control member is manipulatable, said control member being connected to a voltage source for providing electrical signals in accordance with said manipulations, each said electrical signal representing the movement of said control member in one axis of manipulation; signal channels connected to said control member and having a plurality of alterable electrical networks, one associated with each axis of manipulation, each said network receiving the electrical signal provided by said voltage source and produced by manipulation of said control member in the axis associated with said network, each said network including at least one stage of energy storage and at least one motor driven potentiometer for providing in response to it sreceived electrical signal an output signal representing the actual output response of said device as designed at the time of reception of said electrical signal to like manipulations imparted to said device control mechanism in the corresponding axis of manipulation; a signal generator operable to produce a plurality of varying signals one for each axis of manipulation to which it is desired to have the operator conform the network output signal in the corresponding axes by manipulating said control mechanism; an oscilloscope employed as a display device connected to each said electrical network and to said signal generator for receiving each said network's output signal and each said signal generator varying signal and for displaying a representation of each said received signal; a summing network connected to said signal generator and each said electrical network for deriving difference signals for each said axis, the values of said diffference signals for each axis representing the degrees of failure of said operator to conform said output signals in that axis to the signal generator signals in that axis; and means separately responsive to the difference signals for each said axis of manipulation for providing alterations in the network associated with said axis; said alteration means including a selecting device for selecting one network and at least one potentiometer in said selected network to be altered at a time, means connected to said summing network for determining the effect of said alterations upon said difference signals in said axis associated with the network being altered; means responsive to an increase in said diffference signals after an alteration of one kind for causing said alteration means to provide another kind of alteration, and means responsive to the attainment of a predetermined condition in the difference signals in one axis after the alteration of all said potentiometers in the network associated with that axis for caussing said selecting means to select another network to be altered and said alteration means to provide alterations for at least one of said potentiometers at a time in said other selected network until all said potentiometers in all said networks have been altered and the difference signals in all axes have attained said predetermined condition.

References Cited by the Examiner
UNITED STATES PATENTS

| | | | |
|---|---|---|---|
| 2,804,698 | 9/1957 | Grandmont | 32—12 |
| 2,826,828 | 3/1958 | Hamilton | 32—9 |
| 2,916,736 | 12/1959 | VanAlstyne | 35—10.4 |
| 2,924,892 | 2/1960 | Swift | 35—10.4 |
| 2,984,017 | 5/1961 | Pask | 35—8 |
| 3,026,630 | 3/1962 | White et al. | 35—12 |
| 3,046,676 | 7/1962 | Hermann et al. | 35—12 X |
| 3,136,073 | 6/1964 | Steury | 35—6 |

EUGENE R. CAPOZIO, *Primary Examiner.*

LAWRENCE CHARLES, S. M. BENDER, W. NIELSEN, *Assistant Examiners.*